United States Patent
Ogura (10) Patent No.: US 11,281,004 B2
(45) Date of Patent: Mar. 22, 2022

(54) ROTATING DEVICE FOR ROTATING ROTATION OBJECT AND HEAD-UP DISPLAY DEVICE

(71) Applicant: PANASONIC INTELLECTUAL PROPERTY MANAGEMENT CO., LTD., Osaka (JP)

(72) Inventor: Tetsuya Ogura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 456 days.

(21) Appl. No.: 16/352,086

(22) Filed: Mar. 13, 2019

(65) Prior Publication Data

US 2019/0285889 A1 Sep. 19, 2019

(30) Foreign Application Priority Data

Mar. 16, 2018 (JP) .............................. JP2018-050147

(51) Int. Cl.
*G02B 27/01* (2006.01)

(52) U.S. Cl.
CPC .. *G02B 27/0149* (2013.01); *G02B 2027/0154* (2013.01)

(58) Field of Classification Search
CPC ............... G02B 27/0149; G02B 27/01; G02B 27/0101; G02B 2027/0154; B60K 35/00; B60K 2370/152; B60K 2370/31; B60K 2370/334; B60K 2370/52
USPC ........................................................ 359/630
See application file for complete search history.

(56) References Cited

U.S. PATENT DOCUMENTS 9,415,688 B2 * 8/2016 Hagiwara ............. B60K 35/00
2018/0059417 A1 3/2018 Furusawa et al.

FOREIGN PATENT DOCUMENTS

WO 2016/152522 9/2016

\* cited by examiner

*Primary Examiner* — James R Greece
(74) *Attorney, Agent, or Firm* — Greenblum & Bernstein, P.L.C.

(57) ABSTRACT

A second gear includes the second gear meshed with a first gear to rotate, and a protruding part that protrudes in a direction of a rotational axis of a gear part. A supporting part supports the second gear. A spring includes a winding part through which the protruding part is inserted, and a first arm and a second arm extending respectively from the both ends of the winding part. On a first hooked part, the first arm is hooked, and on a second hooked part, the second arm is hooked.

19 Claims, 7 Drawing Sheets

ROTATING DEVICE FOR ROTATING ROTATION OBJECT AND HEAD-UP DISPLAY DEVICE

BACKGROUND

1. Field

The present disclosure relates to a rotating mechanism, and particularly to a rotating device for rotating a rotation object and also to a head-up display device.

2. Description of the Related Art

A head-up display device mounted on a vehicle includes a display, a plane mirror, and a reflecting member, and display light emitted from the display is reflected by the plane mirror and the reflecting member to be provided onto the windshield of the vehicle, thereby performing displaying. In order to adjust the display position of the head-up display device, the reflecting member is rotatably configured with a rotating mechanism. When vibrations caused by traveling of the vehicle or the like are transmitted, the reflecting member is also vibrated due to the rotating mechanism, causing blurring of display. In order to prevent such an incident, a supported part of a projecting shape provided on the reflecting member is inserted into a supporting part of a hole shape provided in the rotating mechanism. The supported part and the supporting part are held by an elastic member, so that the outer surface of the supported part is pressed and fixed to the inner surface of the supporting part (refer to WO 16/152522, for example).

[Patent Document 1] WO 16/152522

By pressing and fixing the reflecting member and the rotating mechanism to each other, vibrations of the reflecting member due to the rotating mechanism can be restrained. However, the torque required to rotate the reflecting member is increased. Accordingly, the motor used for the rotating mechanism is limited to a motor that can generate relatively large torque.

SUMMARY

The present disclosure has been made in view of such a situation, and a purpose thereof is to provide a technology for restraining vibrations while enabling easy rotation.

In response to the above issue, a rotating device according to one aspect of the present disclosure includes: a first gear of a screw shape that rotates about a rotational axis of a motor; a second gear that includes a gear part that is meshed with the first gear and rotates about a rotational axis of which the directions are different from those of the rotational axis of the motor, a protruding part that protrudes in a direction of the rotational axis of the gear part, and a holding part that holds a rotation object at a side opposite to the protruding part with respect to the gear part; a supporting part that supports the second gear of which the protruding part protrudes from a through hole on a first surface side of the supporting part, and the first gear and the gear part or the second gear are disposed on a second surface side of the supporting part opposite to the first surface; a spring that includes a winding part through which the protruding part protruding from the first surface side of the supporting part is inserted, and a first arm and a second arm extending respectively from the both ends of the winding part; and a spring stopper attached to the protruding part such that the winding part of the spring is located between the first surface of the supporting part and the spring stopper. The gear part of the second gear includes a first hooked part on which the first arm of the spring is hooked. The first surface of the supporting part includes a second hooked part on which the second arm of the spring is hooked.

Another aspect of the present disclosure relates to a head-up display device. The head-up display device includes a casing, a rotating device disposed in the casing, and a reflecting mirror rotated by the rotating device. The rotating device includes: a first gear of a screw shape that rotates about a rotational axis of a motor; a second gear that includes a gear part that is meshed with the first gear and rotates about a rotational axis of which the directions are different from those of the rotational axis of the motor, a protruding part that protrudes in a direction of the rotational axis of the gear part, and a holding part that holds the reflecting mirror at a side opposite to the protruding part with respect to the gear part; a supporting part that supports the second gear of which the protruding part protrudes from a through hole on a first surface side of the supporting part, and the first gear and the gear part of the second gear are disposed on a second surface side of the supporting part opposite to the first surface; a spring that includes a winding part through which the protruding part protruding from the first surface side of the supporting part is inserted, and a first arm and a second arm extending respectively from the both ends of the winding part; and a spring stopper attached to the protruding part such that the winding part of the spring is located between the first surface of the supporting part and the spring stopper. The gear part of the second gear includes a first hooked part on which the First arm of the spring is hooked. The first surface of the supporting part includes a second hooked part on which the second arm of the spring is hooked.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

Before specific description of the present embodiment is given, the base findings thereof will be described. The embodiment of the present disclosure describes a head-up display device mounted on a vehicle. A head-up display device is a virtual image display device that projects information as a virtual image on a driving visual field through the windshield, such as to support the driver with view field information. Such head-up display devices are classified into windshield head-up display devices and combiner head-up display devices. A windshield head-up display device displays information on a liquid crystal panel or the like, and the display light is reflected by a mirror to be projected as a virtual image on the windshield. The driver perceives the image as if it is "floating" above the front hood, rather than as a still image on the windshield.

A combiner head-up display device includes a combiner, which is a small transparent plastic disk, disposed on the vehicle cabin side of the windshield, and the combiner is used as a mirror for displaying information, instead of the windshield. Since there is no need to incorporate the windshield into the optical path, combiner head-up display devices can be made smaller, so that they can be easily mounted on compact cars or sports cars. However, since the distance to the visual display of a combiner head-up display device is shorter, drivers need to accustom their eyes to the shorter distance, compared to the case of a windshield head-up display device. In the following, the present embodiment will be described with regard to a windshield head-up display device, which will be hereinafter referred to as a head-up display device.

In a head-up display device, display light emitted from a display device, such as a liquid crystal panel, is reflected by a first reflecting mirror and a second reflecting mirror in this order to reach the windshield. The display light reflected by the windshield then forms, in front of the windshield, a virtual image of the image indicated by the display light, and transmits light from the front. Accordingly, the driver visually recognizes the virtual image and the view in front. An appropriate display position of a virtual image fox a driver is different depending on the height and driving posture of the driver, for example. To adjust the display position, the second reflecting mirror is configured to be rotatable by means of a rotating device. When resonance of such a combination of the second reflecting mirror and the rotating device is caused by vibrations of the vehicle, for example, blurring of virtual image display may be caused. This will degrade the visibility from the driver.

In order to restrain vibrations of the second reflecting mirror in the rotational axis directions and the rotating directions, multiple springs have been conventionally used. Particularly, a spring for restraining vibrations in the rotating directions is pressed onto the back surface of the second reflecting mirror. Accordingly, in order to restrain distortion of the second reflecting mirror caused by such pressing of the spring, the back surface of the second reflecting mirror is formed of an expensive material having excellent rigidity. Also, the multiple springs complicate the structure. Meanwhile, in the case of the structure in which the second reflecting mirror and the rotating device are pressed and fixed to each other, as described in the related art, the torque used to rotate the second reflecting mirror needs to be increased to enable rotation while restraining vibrations, so that a motor that can generate relatively large torque is required. Thus, it is required to restrain vibrations while enabling easy rotation and also to prevent complication of the structure.

In the following description, being "parallel" or "perpendicular" includes, besides being perfectly parallel or perfectly perpendicular, the case of being deviated from the perfectly parallel state or perfectly perpendicular state within a margin of error. Also, the "substantially" means being identical in a general range.

Figure 1A:
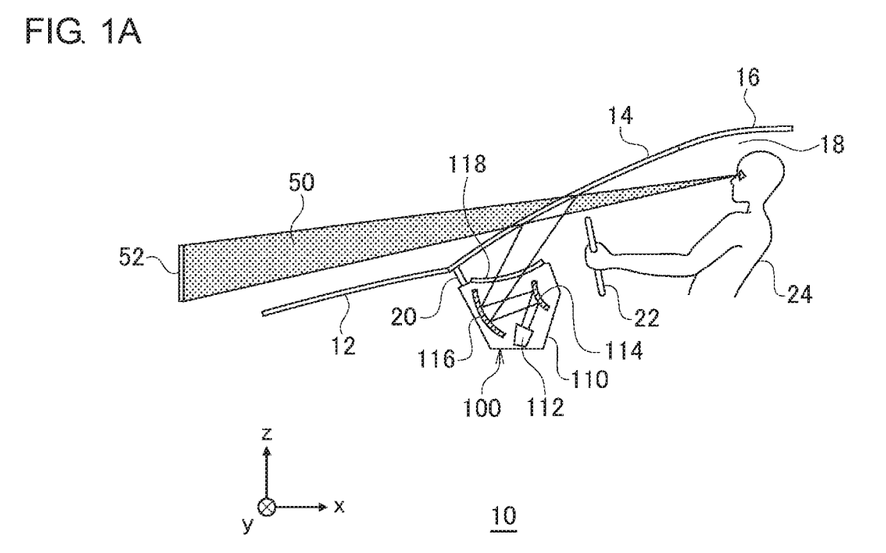
FIGS. 1A-1B are diagrams that each show a configuration of a vehicle in an embodiment.
Figure 1B:
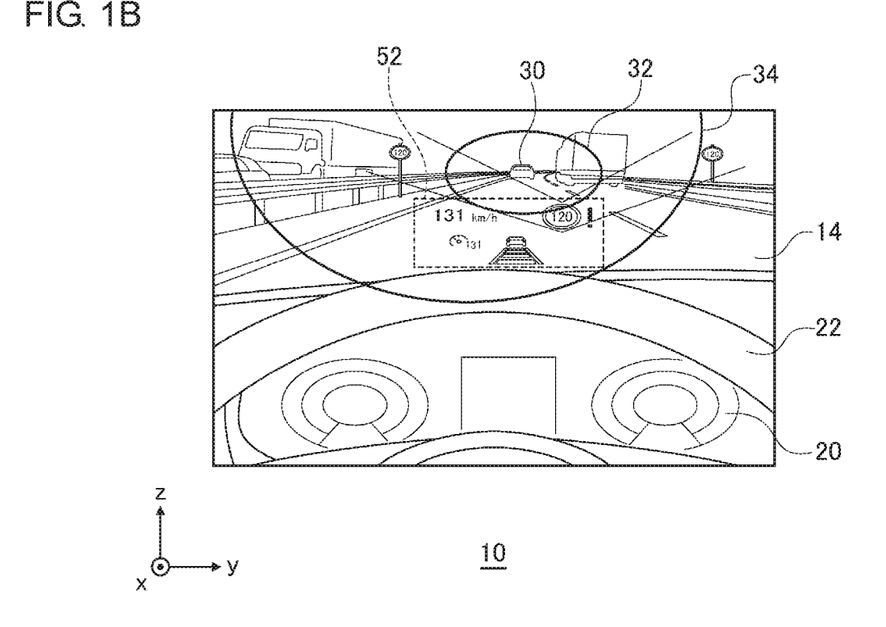

Each of FIGS. 1A-1B shows a configuration of a vehicle 10. As shown in FIGS. 1A-1B, a Cartesian coordinate system is defined by the x-axis, y-axis, and z-axis. The x-axis and y-axis are perpendicular to each other. The x-axis extends in a longitudinal direction of the vehicle 10, and the y-axis extends in a lateral direction of the vehicle 10. The z-axis is perpendicular to the x-axis and y-axis and extends in a height direction of the vehicle 10. The positive directions of the x-axis, y-axis, and z-axis are defined as the respective arrow directions shown in FIGS. 1A-1B, and the negative directions thereof are defined as the directions opposite to the respective arrow directions. In the following, the positive direction of the x-axis may also be referred to as "rearward" or "rear side" and the negative direction thereof as "frontward" or "front side", the positive direction of the y-axis may also be referred to as "rightward" or "right side" and the negative direction thereof as "leftward" or "left side", and the positive direction of the z-axis may also be referred to as "upward" or "upper side" and the negative direction thereof as "downward" or "lower side".

FIG. 1A is a partial sectional view of the vehicle 10 viewed from the left side. A windshield 14 is disposed in the rear of a hood 12, and the windshield 14 extends rearward and also upward. In the rear of the windshield 14, a roof 16 is disposed. A space surrounded by the windshield 14 and the roof 16 is a vehicle cabin 18, and a meter 20 is disposed in a front part of the vehicle cabin 18. In the rear of the meter 20, a steering wheel 22 is disposed. Also, in the rear of the steering wheel 22 in the vehicle cabin 18, a seat, (not illustrated) is disposed, and a driver 24 is sitting on the seat. In such a situation, the driver 24 looks at the view in front through the windshield 14 and also looks at the indication of the meter 20. The distance between the driver 24 and the meter 20 is about 0.8 meters, so that a load of focal point adjustment is put on the driver 24 switching the point to be viewed between the view in front through the windshield 14 and the indication of the meter 20.

In the vehicle cabin 18, a head-up display device 100 is fixed between the vehicle 10 and the steering wheel 22. The head-up display device 100 includes a casing 110, a display device 112, a first reflecting mirror 114, a second reflecting mirror 116, and an opening cover 118. The casing 110 is a box-shaped case of which an upper part is open, and the open part is covered with the opening cover 118 having translucency. The display device 112 is disposed in a lower part of the casing 110, and the display device 112 may be a transmissive liquid crystal display including a liquid crystal panel and a backlight source, or may be a self-luminous display, for example. The display device 112 emits display light 50 that indicates an image for announcing information including various pieces of vehicle information, such as the traveling speed of the vehicle and various warnings, and navigation information.

The first reflecting mirror 114 reflects the display light 50 entitled from the display device 112 toward the second reflecting mirror 116. The second reflecting mirror 116 then further reflects the display light 50 reflected by the first reflecting mirror 114. The display light 50 reflected by the second reflecting mirror 116 penetrates the opening cover 118 provided over the opening of the casing 110 and travels toward the windshield 14. The display light 50 reaches the windshield 14 and is reflected by the windshield 14, forming a virtual image 52 of the image at a position in front of the windshield 14 and transmitting light from the front. Accordingly, the head-up display device 100 allows the driver 24 to visually recognize both the virtual image 52 and the view in front. The distance between the driver 24 and the virtual image 52 is about 2 meters, which is longer than the distance between the driver 24 and the meter 20, and, in addition, the viewing directions toward the virtual image 52 and the view in front are close. Therefore, in the case of switching the point to be viewed between the view in front through the windshield 14 and the virtual image 52, the load of focal point adjustment can be reduced.

FIG. 1B shows the configuration of the vehicle 10 viewed from the inside of the vehicle cabin 18 toward the front side. The meter 20 is disposed in front of the steering wheel 22, and the windshield 14 is disposed thereabove. Also, the view in front is visually recognized through the windshield 14. Since the driver 24, not illustrated, is watching another vehicle traveling ahead in the view in front, the another vehicle is set as a watching point 30. Also, the vicinity of the watching point 30 is set as an effective visual field 32, and the vicinity of the effective visual field 32 is set as a guiding visual field 34. The effective visual field 32 is a range Ln which information can be instantly accepted, and the guiding visual field 34 is a range in which the presence of provided information can be perceived. The virtual image 52 is displayed in front of the windshield 14. Since the virtual image 52 is included in the effective visual field 32 and the guiding visual field 34, the driver 24 can immediately recognize what is included in the virtual image 52.

Figure 2:
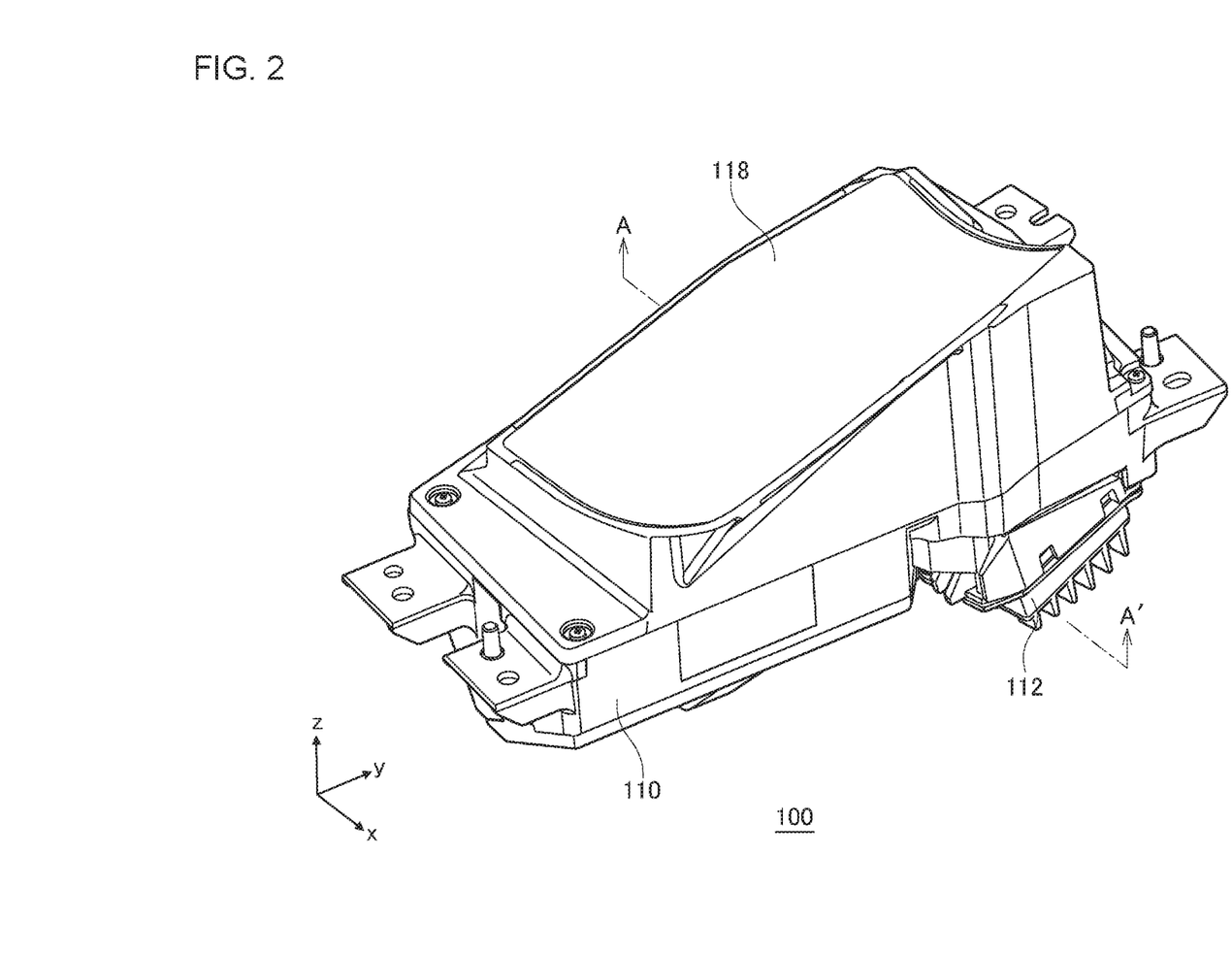
FIG. 2 is a perspective view that shows a configuration of a head-up display device shown in FIG. 1A.
Figure 3:
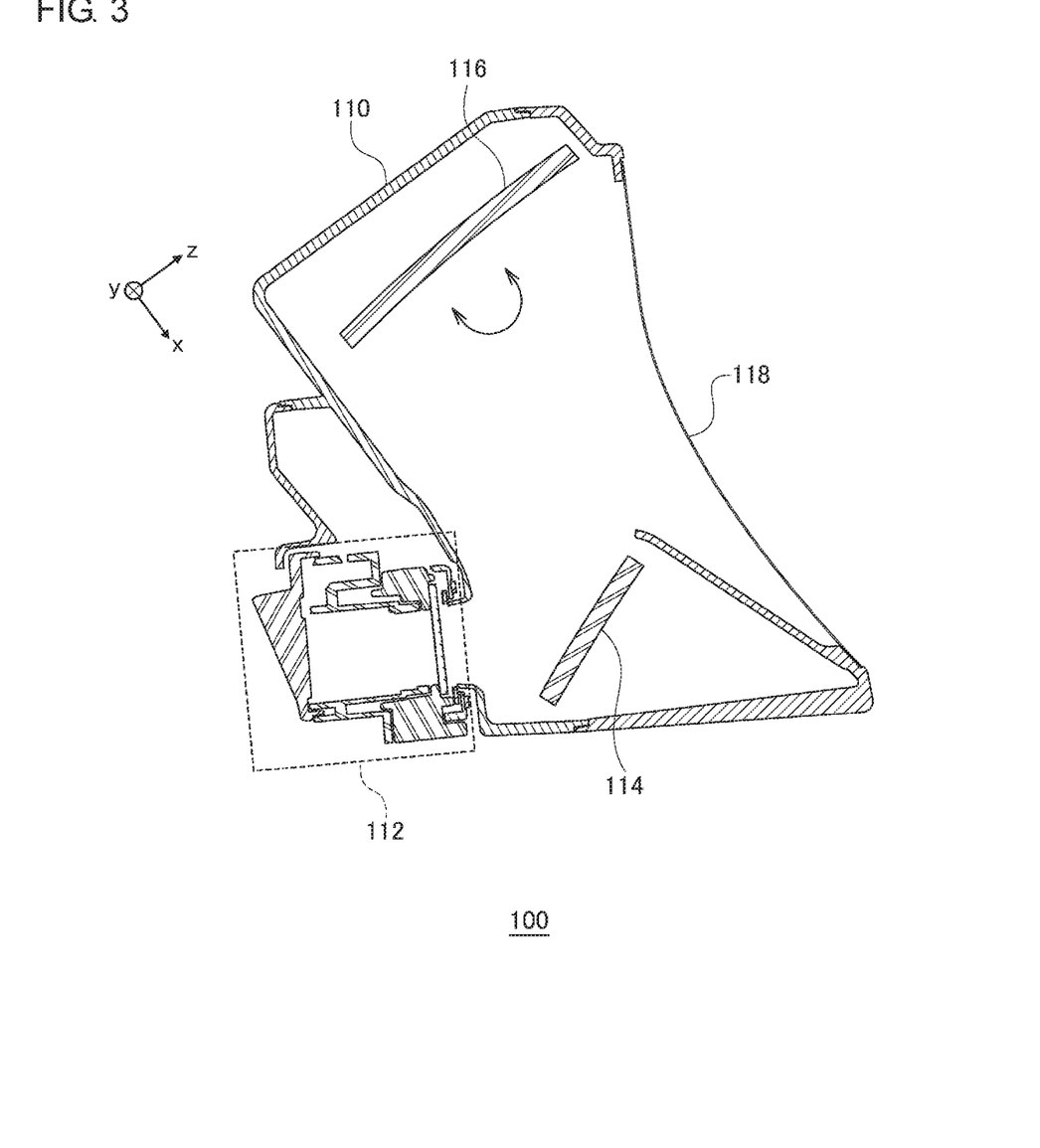
FIG. 3 is a sectional view that shows the configuration of the head-up display device shown in FIG. 2.

FIG. 2 is a perspective view that shows a configuration of the head-up display device 100. FIG. 3 is a sectional view that shows the configuration of the head-up display device 100, taken along line A-A' of FIG. 2. The casing 110 has a box shape of which the lateral length is longer than the longitudinal length, and has a hollow structure for accommodating the first reflecting mirror 114 and the second reflecting mirror 116. The casing 110 includes an attachment structure for the vehicle 10 so as to be attached to the vehicle 10. An upper part of the casing 110 is open. The casing 110 may be formed of synthetic resin with no translucency, such as black synthetic resin. The opening of the casing 110 is covered with the opening cover 118. The opening cover 118 may be formed of synthetic resin with translucency, for example, and prevents intrusion of foreign matter into the casing 110.

The display device 112 is disposed in a lower and rear part of the casing 110. The display device 112 is capable of emitting the display light 50 (not illustrated) upward. Accordingly, the display light 50 is emitted from the display device 112 to the internal space under the opening cover 118. The first reflecting mirror 114 is disposed above the display device 112 such as to face the display device 112 and is fixed within the casing 110. The first reflecting mirror 114 enlarges and reflects the display light 50 from the display device 112 frontward.

The second reflecting mirror 116 is disposed in front of the first reflecting mirror 114 such as to face the first reflecting mirror 114. The second reflecting mirror 116 reflects the display light 50 from the first reflecting mirror 114 upward. As described previously, the virtual image 52 formed by the display light 50 is displayed as shown in FIG. 1B. An appropriate display position of the virtual image 52 for the driver 24, i.e., a display position of the virtual image 52 to which the driver 24 can easily adjust the focal point, is different depending on the height and driving posture of the driver, for example. Accordingly, the display position of the virtual image 52 is to be adjusted in the vertical directions. In order to achieve the configuration, the second reflecting mirror 116 is made rotatable in the directions indicated by the arrow shown in FIG. 3. To rotate the second reflecting mirror 116, a rotating device (not illustrated) disposed within the casing 110 holds the second reflecting mirror 116. In the following, the configuration of the rotating device will be described.

Figure 4:
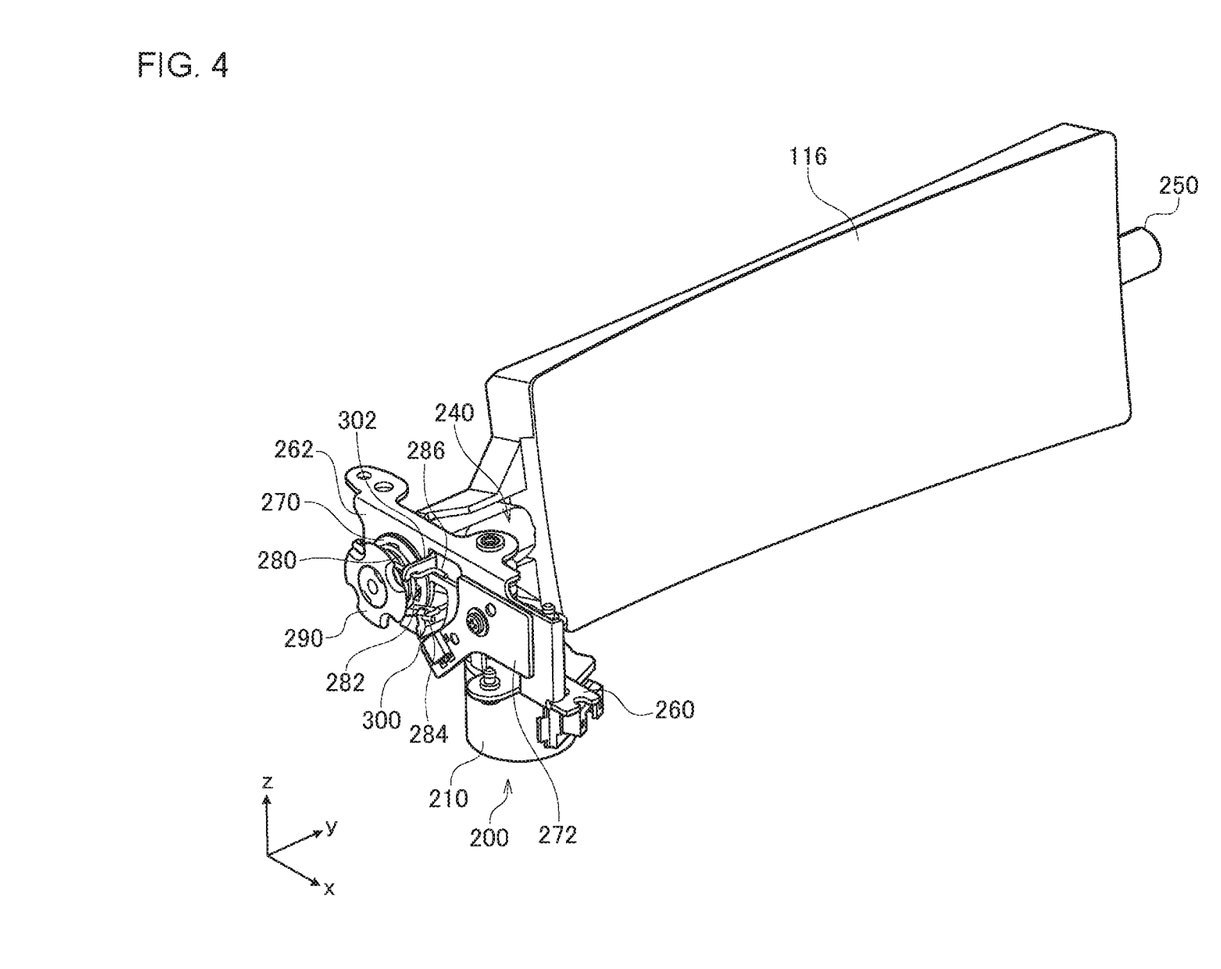
FIG. 4 is a perspective view that shows configurations of a second reflecting mirror shown in FIG. 3 and a rotating device that holds the second reflecting mirror.
Figure 5:
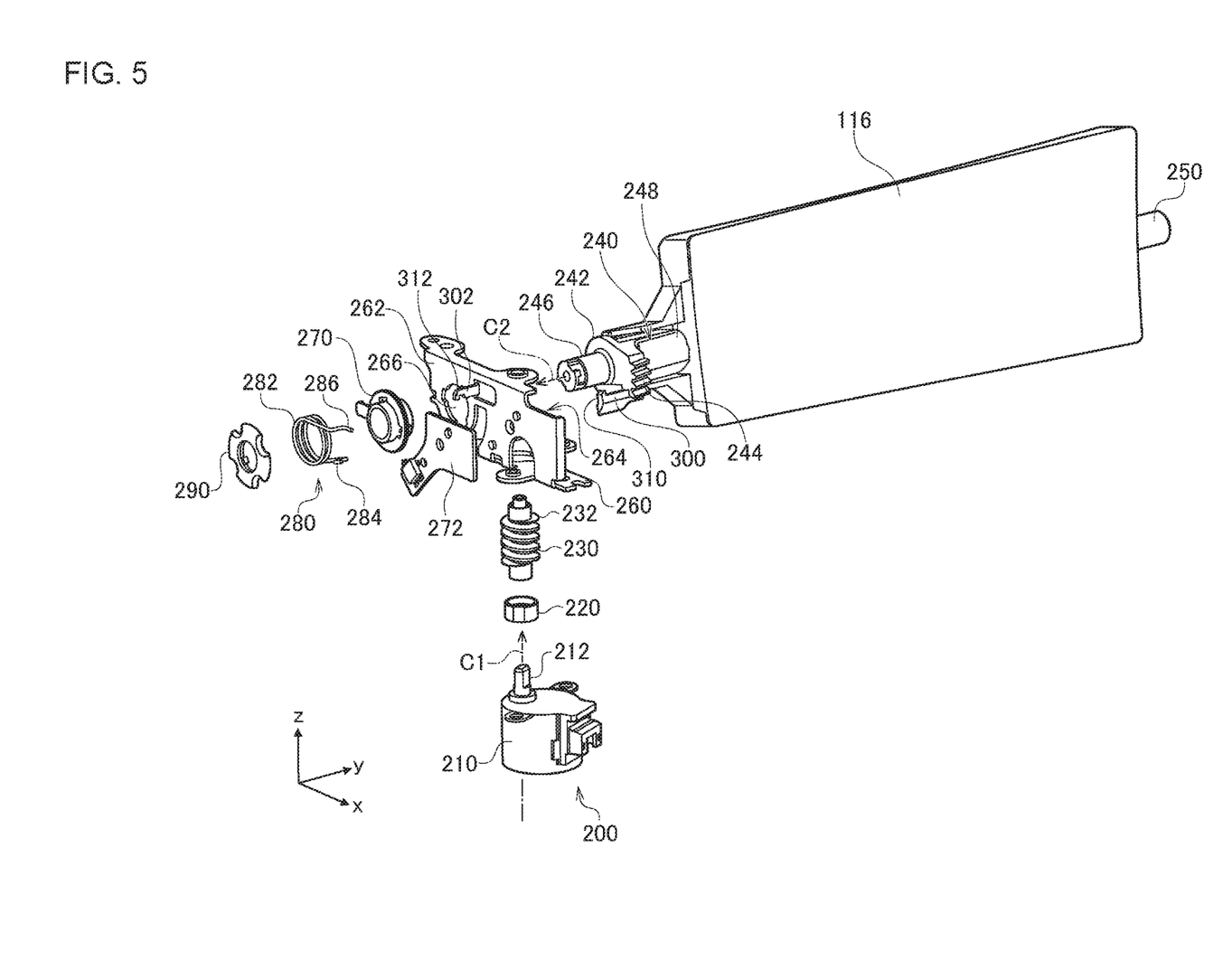
FIG. 5 as an exploded perspective view that shows the configurations of the second reflecting mirror and the rotating device shown in FIG. 4.
Figure 6A:
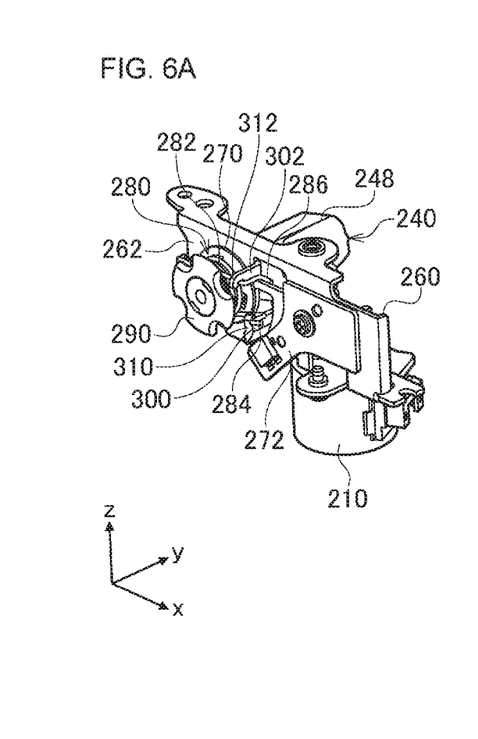
FIGS. 6A-6C are diagrams that each show the configuration of the rotating device shown in FIG. 4.
Figure 6B:
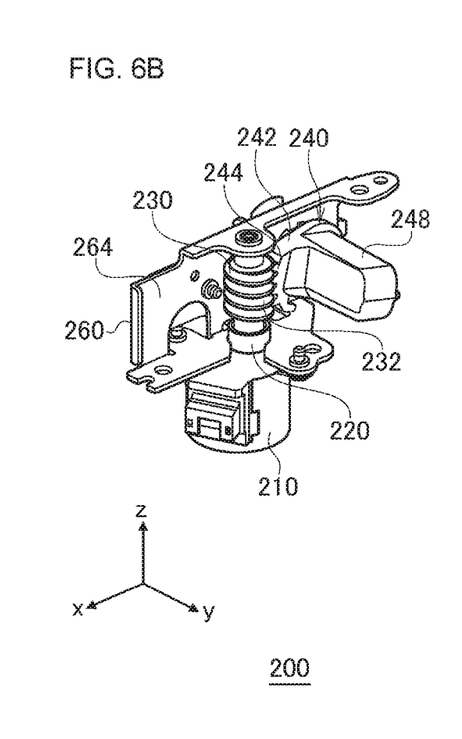
Figure 6C:
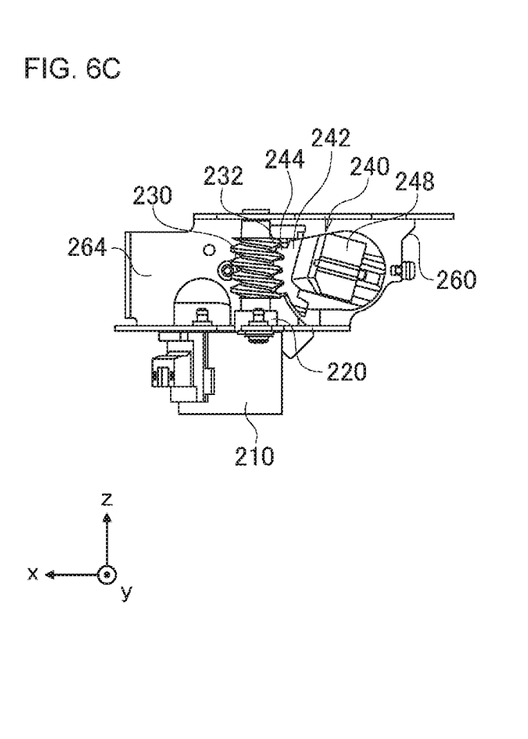

FIG. 4 is a perspective view that shows configurations of the second reflecting mirror 116 and a rotating device 200 that holds the second reflecting mirror 116. FIG. 5 is an exploded perspective view that shows the configurations of the second reflecting mirror 116 and the rotating device 200. Also, each of FIGS. 6A-6C shows the configuration of the rotating device 200. The rotating device 200 includes a stepping motor 210, a motor collar 220, a first gear 230, a second gear 240, a supporting part 260, a shaft collar 270, a substrate 272, a spring 280, and a spring stopper 290. Further, the stepping motor 210 includes a shaft 212, and the first gear 230 includes first gear teeth 232. The second gear 240 includes a gear part 242, second gear teeth 244, a protruding part 246, a holding part 248, and a first hooked part 300. The supporting part 260 includes a first surface 262, a second surface 264, a through hole 266, and a second hooked part 302. The spring 280 includes a winding part 282, a first arm 284, and a second arm 286. Also, the second reflecting mirror 116 includes a shaft part 250.

The stepping motor 210 includes, in an upper part thereof, the shaft 212 of a rod-like shape protruding upward. The shaft 212 is rotatable about a first rotational axis C1 extending in a vertical direction. Upon reception of a drive signal, the stepping motor 210 rotates the shaft 212 to a position corresponding to an electric angle indicated by the drive signal. To the shaft 212, the first gear 230 extending in a vertical direction is attached. The first gear 230 includes the first gear teeth 232 of a screw shape. Since the first gear 230 rotates about the first rotational axis C1 as the shaft 212 rotates, the first gear teeth 232 also rotate about the first rotational axis C1. Between the first gear 230 and the shaft 212, the motor collar 220 of a ring shape is disposed.

The first gear 230 is meshed with the gear part 242 of the second gear 240. More specifically, the second gear teeth 244 are formed on the gear part 242, and the first gear teeth 232 of the first gear 230 are meshed with the second gear teeth 244. The gear part 242 is rotatable about a second rotational axis C2 extending in a lateral direction, which is different from the vertical direction in which the first rotational axis C1 extends. With such a structure, the first gear 230 and the gear part 242 form a worm gear, so that, when the first gear 230 rotates about the first rotational axis C1, the gear part 242 rotates about the second rotational axis C2.

To the right side of the gear part 242, the holding part 243 is disposed to hold the second reflecting mirror 116 as the rotation object. The second reflecting mirror 116 may be, for example, a concave mirror obtained by providing a reflecting film on a surface of a base member made of a synthetic resin material, by means of vapor deposition or the like. Meanwhile, at a side opposite to the holding part 248 with respect to the gear part 242, the protruding part 246, having a cylindrical shape and extending leftward along the second rotational axis C2, is disposed. Accordingly, it can be said that the protruding part 246 is protruding in the direction of the second rotational axis C2. Since the gear part 242, protruding part 246, and holding part 248 are integrally formed, when the gear part 242 rotates, the protruding part 246 and holding part 248 also rotate in the same direction.

To the right side of the second reflecting mirror 116, the shaft part 250 of a cylindrical shape is disposed. The shaft part 250 is rotatably supported by a bearing part (not illustrated) of the casing 110. The shaft part 250 also rotates about the second rotational axis C2. Accordingly, when the second gear 240 rotates, the shaft part 250 also rotates, so that the second reflecting mirror 116 also rotates.

The supporting part 260 has a wall shape along a z-x plane. The first surface 262 of the supporting part 260 faces the left side, and the second surface 264 of the supporting part 260 faces the right side. In other words, the first surface 262 and the second surface 264 respectively face opposite directions. The through hole 266 of a circle shape is formed such as to pierce through the first surface 262 and the second surface 264. The protruding part 246 of the second gear 240 is made to penetrate through the through hole 266 from the right side to the left side. Accordingly, the protruding part 246 protrudes from the through hole 266 on the first surface 262 side. Meanwhile, on the second surface 264 side, the first gear 230 and the gear part 242 of the second gear 240 are disposed. With such a structure, the supporting part 260 supports the second gear 240 and the second reflecting mirror 116.

In the state where the protruding part 246 is protruding from the first surface 262, the shaft collar 270 is attached to the first surface 262. The shaft collar 270 has a ring shape and, through the opening at the center, the protruding part 246 penetrates. The substrate 272 is also attached to the first surface 262. On the substrate 272, a circuit for controlling the position of the stepping motor 210 is mounted. Since a publicly-known technology may be used for the circuit, a specific description thereof will be omitted here.

The spring 280 is formed by processing a metal wire, for example, and provided with combined functions of a compression spring and a torsion coil spring. The spring 280 is integrally formed by the winding part 282, first arm 284, and second arm 286. The winding part 282 has a spiral shape. Through the winding part 282, the protruding part 246 protruding from the first surface 262 side of the supporting part 260 is inserted. To the tip of the protruding part 246, the spring stopper 290 is attached. Accordingly, the winding part 282 is located between the first surface 262 and the spring stopper 290. The winding part 282 between the first surface 262 and the spring stopper 290 is placed in a state of being elastically deformed in a lateral direction. From the both ends of the winding part 282, the first arm 284 and the second arm 286 respectively extend linearly.

On the left-side surface of the gear part 242 of the second gear 240, the first hooked part 300 protruding leftward is disposed. The first hooked part 300 has a first hook part 310 at the tip and holds the first arm 284 of the spring 280 hooked on the first hook part 310. Meanwhile, on the first surface 262 of the supporting part 260, a second hooked part 302 protruding leftward is disposed. The second nocked part 302 has a second hook part 312 at the tip and holds the second arm 286 of the spring 280 hooked on the second hock part 312.

Figure 7A:
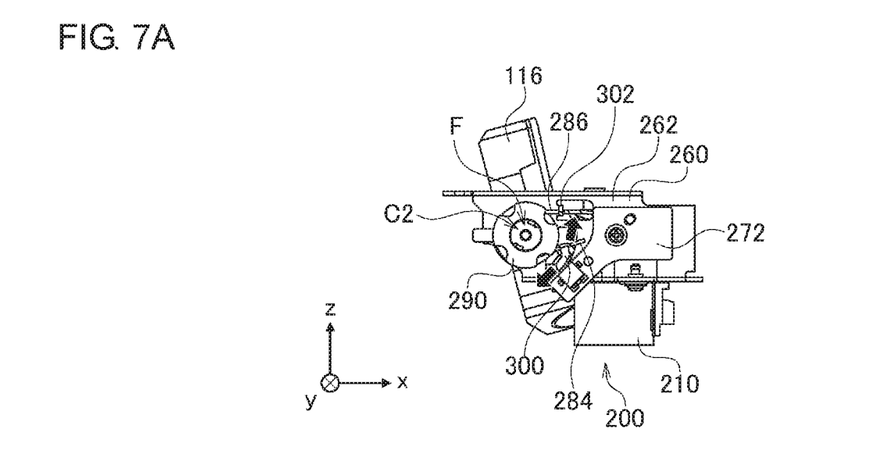
FIGS. 7A-7B are diagrams that show functions provided by the second reflecting mirror and the rotating device shown in FIG. 4.
Figure 7B:
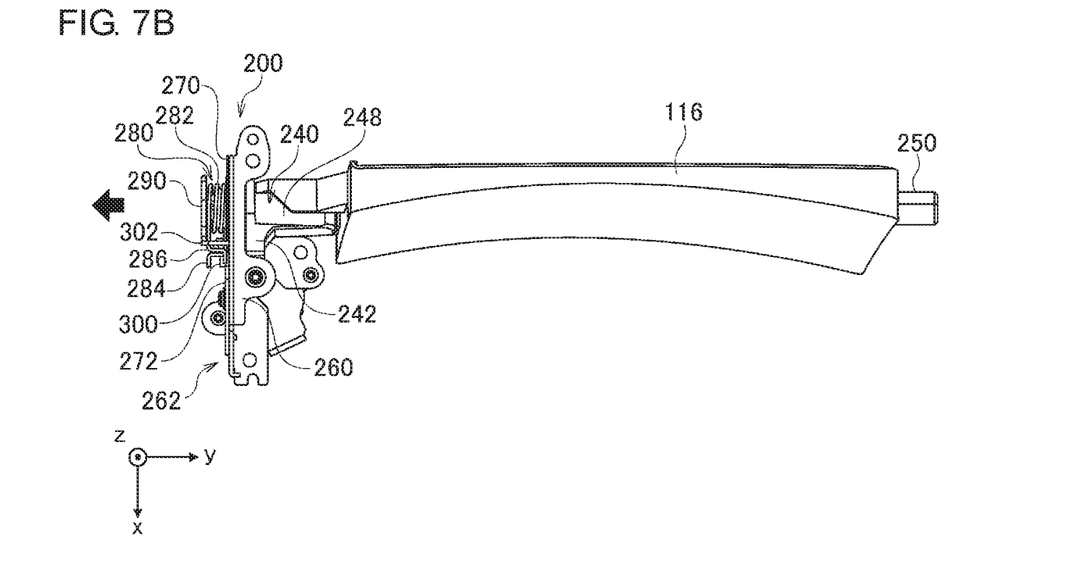

FIGS. 7A-7B show functions provided by the second reflecting mirror 116 and the rotating device 200. FIG. 7A is a diagram of the second reflecting mirror 116 and the rotating device 200 viewed from the left side. The center of gravity F of the second reflecting mirror 116 including the second gear 240 is positioned close to the second rotational axis C2 of the gear part 242 of the second gear 240. With such adjustment of the position of the center of gravity, the second reflecting mirror 116 can be smoothly rotated by the second gear 240. As described previously, such rotation is enabled by movement of the first gear 230 and the gear part 242 meshed with each other. In such machine elements, a clearance called backlash is provided in the direction of movement of the first gear teeth 232 of the first gear 230 and the second gear teeth 244 of the gear part 242. The backlash causes play in the second gear 240 with which a tooth of the first gear teeth 232 can freely reciprocate between adjacent teeth of the second gear teeth 244. Such play may cause the second reflecting mirror 116 to wobble in the rotating directions.

To prevent the wobble in the rotating directions, a torsion spring constituted by the first arm 284 and the second arm 286 located at the both ends of the winding part 282 is used. More specifically, when a load in a direction of reducing the distance between the first arm 284 and the second arm 286 is applied to the gear part 242, the torsion spring is elastically deformed in a direction of increasing the distance. The directions of the elastic deformation are indicated by the arrows in FIG. 7A. The elastic deformation restrains the reduction of the distance between the first arm 284 and the second arm 286, thereby also restraining a change of position of the gear part 242. Consequently, the move of the second reflecting mirror 116 is restrained, so that the wobble of the second reflecting mirror 116 in the rotating directions can be prevented. For such a torsion spring for reducing backlash, force of 3 G or greater is required.

FIG. 7B is a top view of the second reflecting mirror 116 and the rotating device 200. The shaft part 250 is supported by the bearing part (not illustrated), and the second gear 240 is supported by the supporting part 260. Since such supporting is not implemented by fixing, the second reflecting mirror 116 can freely reciprocate in the lateral directions. This may cause the second reflecting mirror 116 to wobble in the axial directions. To prevent the wobble in the axial directions, a coil spring provided by the winding part 282 is used. More specifically, since spaces are provided between the windings in the winding part 282, the coil spring is elastically deformed in a direction of reducing the spaces. The direction of the elastic deformation is indicated by the arrow in FIG. 7B. The elastic deformation restrains the leftward move of the second gear 240, thereby preventing the wobble of the second reflecting mirror 116 in the axial directions.

As shown in FIGS. 7A-7B, the spring 280 has a function of a torsion spring and also has a function of a coil spring. The load on the spring 280 having such functions is received by the first hooked part 300 and the second hooked part 302.

In the embodiment of the present disclosure, since the spring including the first arm and the second arm, which extend respectively from the both ends of the winding part, is hooked on the first hooked part and the second hooked part, the spring can be used as a torsion spring. Since the spring is used as a torsion spring, freedom of movement in the rotating directions caused by backlash between the first gear and the second gear can be reduced. Since the freedom of movement in the rotating directions caused by backlash is reduced, movement of the second gear in the rotating directions can be limited. Since the movement of the second gear in the rotating directions is limited, vibrations of the reflecting mirror can be restrained. Since the vibrations of the reflecting mirror are restrained merely by the torsion spring, the reflecting mirror can be easily rotated.

Also, since the spring including the first arm and the second arm, which extend respectively from the both ends of the winding part, is hooked on the first hooked part and the second hooked part, the spring can be used as a coil spring. Since the spring is used as a coil spring, freedom of movement in the axial directions in the second gear can be reduced. Since the freedom of movement in the axial directions in the second gear is reduced, movement of the second gear in the axial directions can be limited. Since the movement of the second gear in the axial directions is limited, vibrations of the reflecting mirror can be restrained. Since the vibrations of the reflecting mirror are restrained merely by the coil spring, the reflecting mirror can be easily rotated. Further, since the rotational axis of the second gear and the center of gravity of the reflecting mirror are positioned close to each other, the reflecting mirror can be smoothly rotated.

The outline of one embodiment of the present disclosure is as follows. A rotating device according to one aspect of the present disclosure includes: a first gear of a screw shape that rotates about a rotational axis of a motor; a second gear that includes a gear part that is meshed with the first gear and rotates about a rotational axis of which the direction are different from those of the rotational axis of the motor, a protruding part that protrudes in a direction of the rotational axis of the gear part, and a holding part that holds a rotation object at a side opposite to the protruding part with respect to the gear part; a supporting part that supports the second gear of which the protruding part protrudes from a through hole on a first surface side of the supporting part, and the first gear and the gear part of the second gear are disposed on a second surface side of the supporting part opposite to the first surface; a spring that includes a winding part through which the protruding part protruding from the first surface side of the supporting part is inserted, and a first arm and a second arm extending respectively from the both ends of the winding part; and a spring stopper attached to the protruding part such that the winding part of the spring is located between the first surface of the supporting part and the spring stopper. The gear part of the second gear includes a first hooked part on which the first arm of the spring is hooked. The first surface of the supporting part includes a second hooked part on which the second arm of the spring is hooked.

According to this aspect, since a spring including the first arm and the second arm, which extend respectively from the both ends of the winding part, is hooked on the second gear and the supporting part, movement of the second gear in the rotating directions and the axial directions can be limited. Accordingly, vibrations can be restrained while easy rotation of the rotation object is enabled.

Another aspect of the present, disclosure relates to a head-up display device. The head-up display device includes a casing, a rotating device disposed in the casing, and a reflecting mirror rotated by the rotating device. The rotating device includes: a first gear of a screw shape that rotates about a rotational axis of a motor; a second gear that includes a gear part that is meshed with the first gear and rotates about a rotational axis of which the directions are different from those of the rotational axis of the motor, a protruding part that protrudes in a direction of the rotational axis of the gear part, and a holding part that holds the reflecting mirror at a side opposite to the protruding part with respect to the gear part; a supporting part that supports the second gear of which the protruding part protrudes from a through hole on a first surface side of the supporting part, and the first gear and the gear part of the second gear are disposed on a second surface side of the supporting part opposite to the first surface; a spring that includes a winding part through which the protruding part protruding from the first surface side of the supporting part is inserted, and a first arm and a second arm extending respectively from the both ends of the winding part; and a spring stopper attached to the protruding part such that the winding part of the spring is located between the first surface of the supporting part and the spring stopper. The gear part of the second gear includes a first hooked part on which the first arm of the spring is hooked. The first surface of the supporting part includes a second hooked part on which the second arm of the spring is hooked.

According to this aspect, since a spring Including the first arm and the second arm, which extend respectively from the both ends of the winding part, is hooked on the second gear and the supporting part, movement of the second gear in the rotating directions and the axial directions can be limited. Accordingly, vibrations can be restrained while easy rotation of the reflecting mirror is enabled.

The rotational axis of the gear part of the second gear may be positioned close to the center of gravity of the reflecting mirror including the second gear. In this case, since the rotational axis of the second gear and the center of gravity of the reflecting mirror are positioned close to each other, the reflecting mirror can be smoothly rotated.

The present disclosure has been described with reference to the embodiment. The embodiment is intended to be illustrative only, and it will be obvious to those skilled in the art that various modifications to a combination of constituting elements or processes in the embodiment could be developed and that such modifications also fall within the scope of the present disclosure.

In the present embodiment, the rotating device 200 holds the second reflecting mirror 116 as the rotation object. However, the application is not limited thereto, and the rotating device 200 may hold a rotation object other than the second reflecting mirror 116. This modification extends the applicable range.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2018-050147, filed on Mar. 16, 2018, the entire contents of which are incorporated herein by reference.

What is claimed is:

1. A rotating device, comprising:
a first gear of a screw shape that rotates about a rotational axis of a motor;
a second gear that comprises a gear part that is meshed with the first gear and rotates about a rotational axis of which the directions are different from those of the rotational axis of the motor, a protruding part that protrudes in a direction of the rotational axis of the gear part, and a holding part that holds a rotation object at a side opposite to the protruding part with respect to the gear part;
a supporting part that supports the second gear of which the protruding part protrudes from a through hole on a first surface side of the supporting part, the first gear and the gear part of the second gear being disposed on a second surface side of the supporting part opposite to the first surface;
a spring that comprises a winding part through which the protruding part protruding from the first surface side of the supporting part is inserted, and a first arm and a second arm extending respectively from the both ends of the winding part; and a spring stopper attached to the protruding part such that the winding part of the spring is located between the first surface of the supporting part and the spring stopper, wherein:

the gear part of the second gear comprises a first hooked part on which the first arm of the spring is hooked; and the first surface of the supporting part comprises a second hooked part on which the second arm of the spring is hooked.

2. The rotating device of claim 1, wherein the motor comprises a shaft to which the first gear is attached and rotates, upon reception of a drive signal, the shaft to a position corresponding to an electric angle indicated by the drive signal.

3. The rotating device of claim 1, wherein the first gear and the gear part of the second gear form a worm gear.

4. The rotating device of claim 1, wherein the spring is a torsion spring.

5. The rotating device of claim 1, wherein the first hooked part includes a first hook part at the tip and holds the first arm of the spring hooked on the first hook part.

6. The rotating device of claim 4, wherein the first hooked part includes a first hook part at the tip and holds the first arm of the spring hooked on the first hook part.

7. The rotating device of claim 1, wherein the second hooked part includes a second hook part at the tip and holds the second arm of the spring hooked on the second hook part.

8. The rotating device of claim 5, wherein the second hooked part includes a second hook part at the tip and holds the second arm of the spring hooked on the second hook part.

9. The rotating device of claim 6, wherein the second hooked part includes a second nook part at the tip and holds the second arm of the spring hooked on the second hook part.

10. A head-op display device, comprising:
a casing;
a rotating device disposed in the casing; and
a reflecting mirror rotated by the rotating device,
the rotating device comprising:
  a first gear of a screw shape that rotates about a rotational axis of a motor;
  a second gear that comprises a gear part that is meshed with the first gear and rotates about a rotational axis of which the directions are different from those of the rotational axis of the motor, a protruding part that protrudes in a direction of the rotational axis of the gear part, and a holding part that holds the reflecting mirror at a side opposite to the protruding part with respect to the gear part;
  a supporting part that supports the second gear of which the protruding part protrudes from a through hole on a first surface side of the supporting part, the first gear and the gear part of the second gear being disposed on a second surface side of the supporting part opposite to the first surface;
  a spring that comprises a winding part through which the protruding part protruding from the first surface side of the supporting part is inserted, and a first arm and a second arm extending respectively from the both ends of the winding part; and
  a spring stopper attached to the protruding part such that the winding part of the spring is located between the first surface of the supporting part and the spring stopper, wherein:
  the gear part of the second gear comprises a first hooked part on which the first arm of the spring is hooked; and
  the first surface of the supporting part comprises a second hooked part on which the second arm of the spring is hooked.

11. The head-up display device of claim 10, wherein the rotational axis of the gear part of the second gear is positioned close to the center of gravity of the reflecting mirror including the second gear.

12. The head-up display device of claim 10, wherein the motor comprises a shaft to which the first gear is attached and rotates, upon reception of a drive signal, the shaft to a position corresponding to an electric angle indicated by the drive signal.

13. The head-up display device of claim 10, wherein the first gear and the gear part of the second gear form a worm gear.

14. The head-up display device of claim 10, wherein the spring is a torsion spring.

15. The head-up display device of claim 10, wherein the first hooked part includes a first hook part at the tip and holds the first arm of the spring hooked on the first hook part.

16. The head-up display device of claim 14, wherein the first hooked part includes a first hook part at the tip and holds the first arm of the spring hooked on the first hook part.

17. The head-up display device of claim 10, wherein the second hooked part includes a second hook part at the tip and holds the second arm of the spring hooked on the second hook part.

18. The head-up display device of claim 15, wherein the second hooked part includes a second hook part at the tip and holds the second arm of the spring hooked on the second hook part.

19. The head-up display device of claim 16, wherein the second hooked part includes a second hook part at the tip and holds the second arm of the spring hooked on the second hook part.

* * * * *